Nov. 26, 1935. H. T. AVERY ET AL 2,022,103
CALCULATING MACHINE
Original Filed Nov. 6, 1929 12 Sheets-Sheet 5

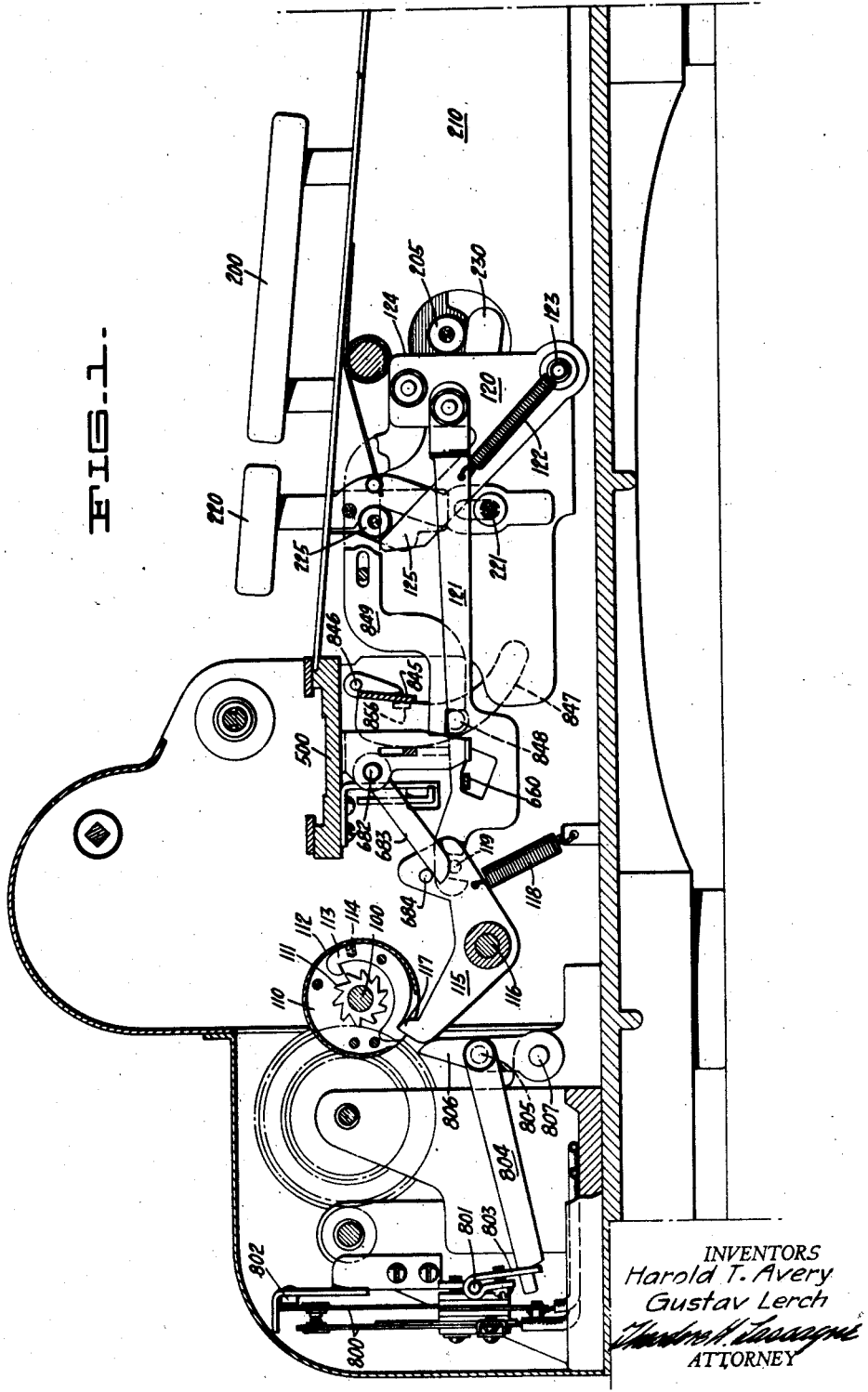

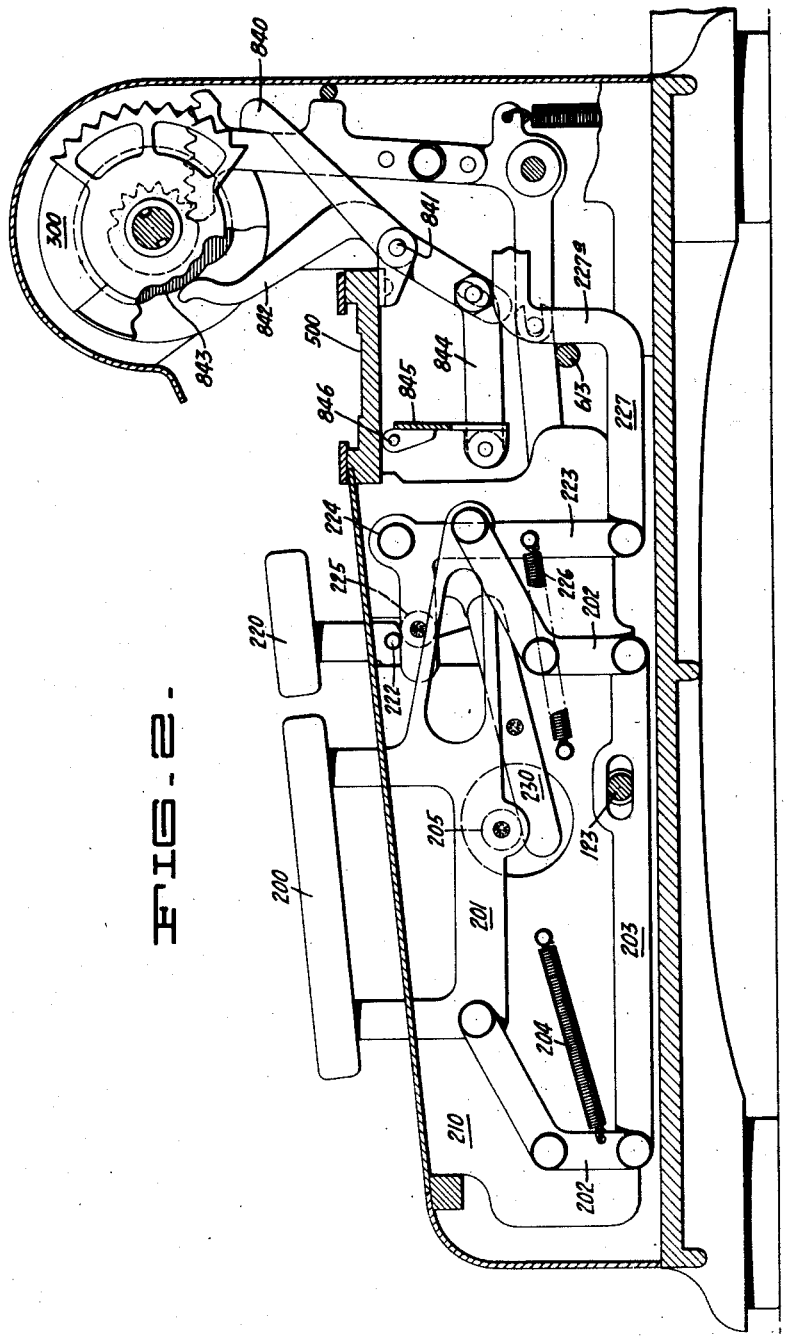

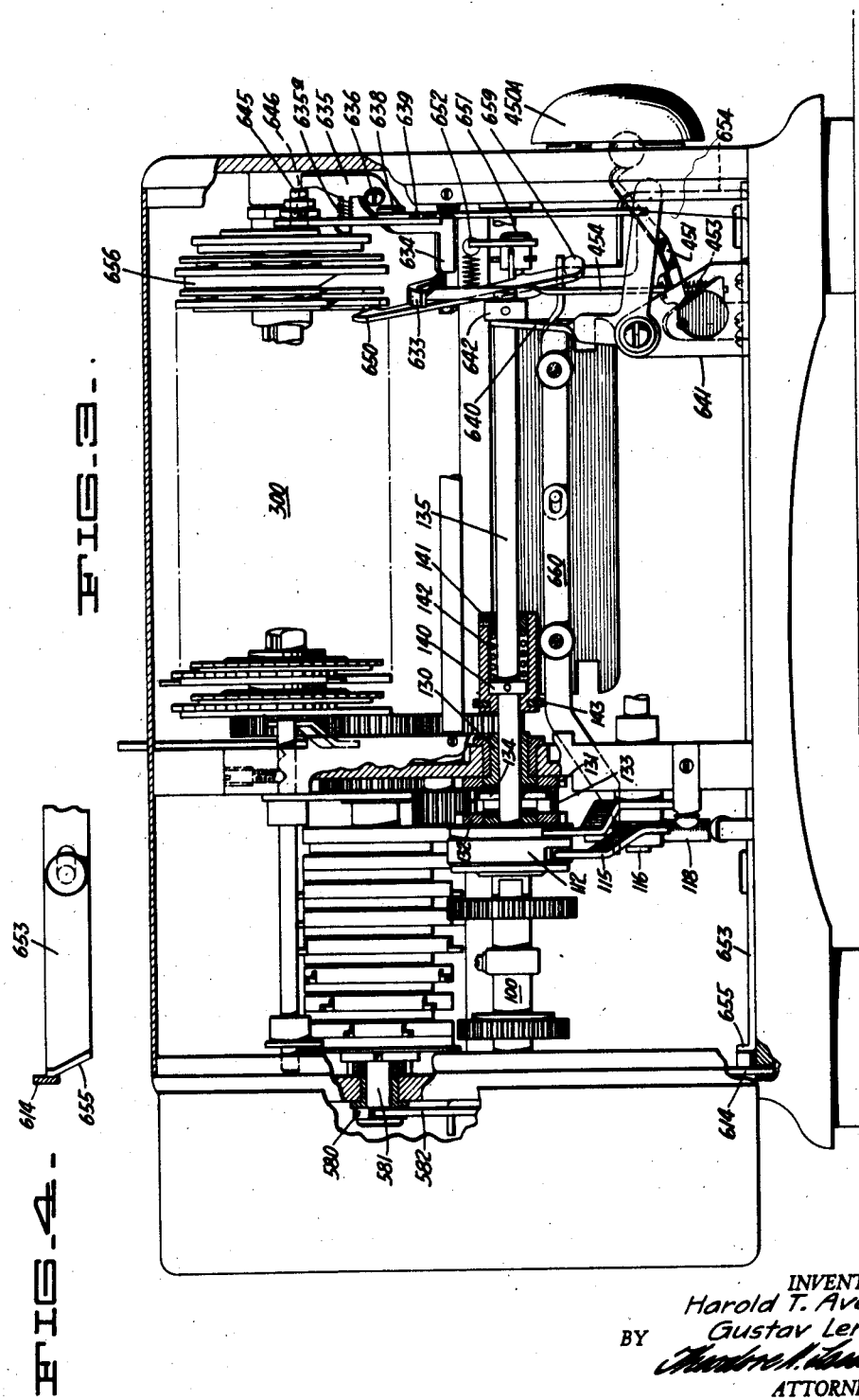

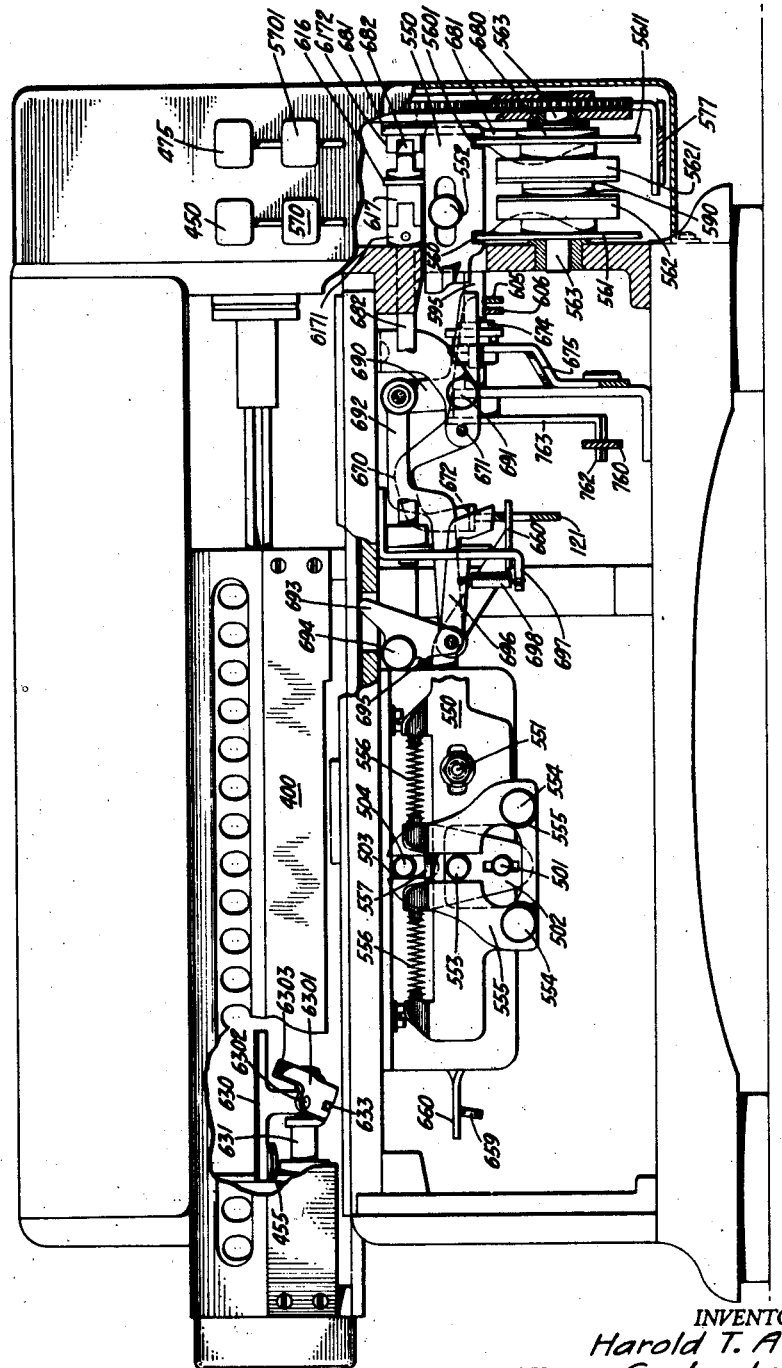

INVENTORS
Harold T. Avery
BY Gustav Lerch
ATTORNEY

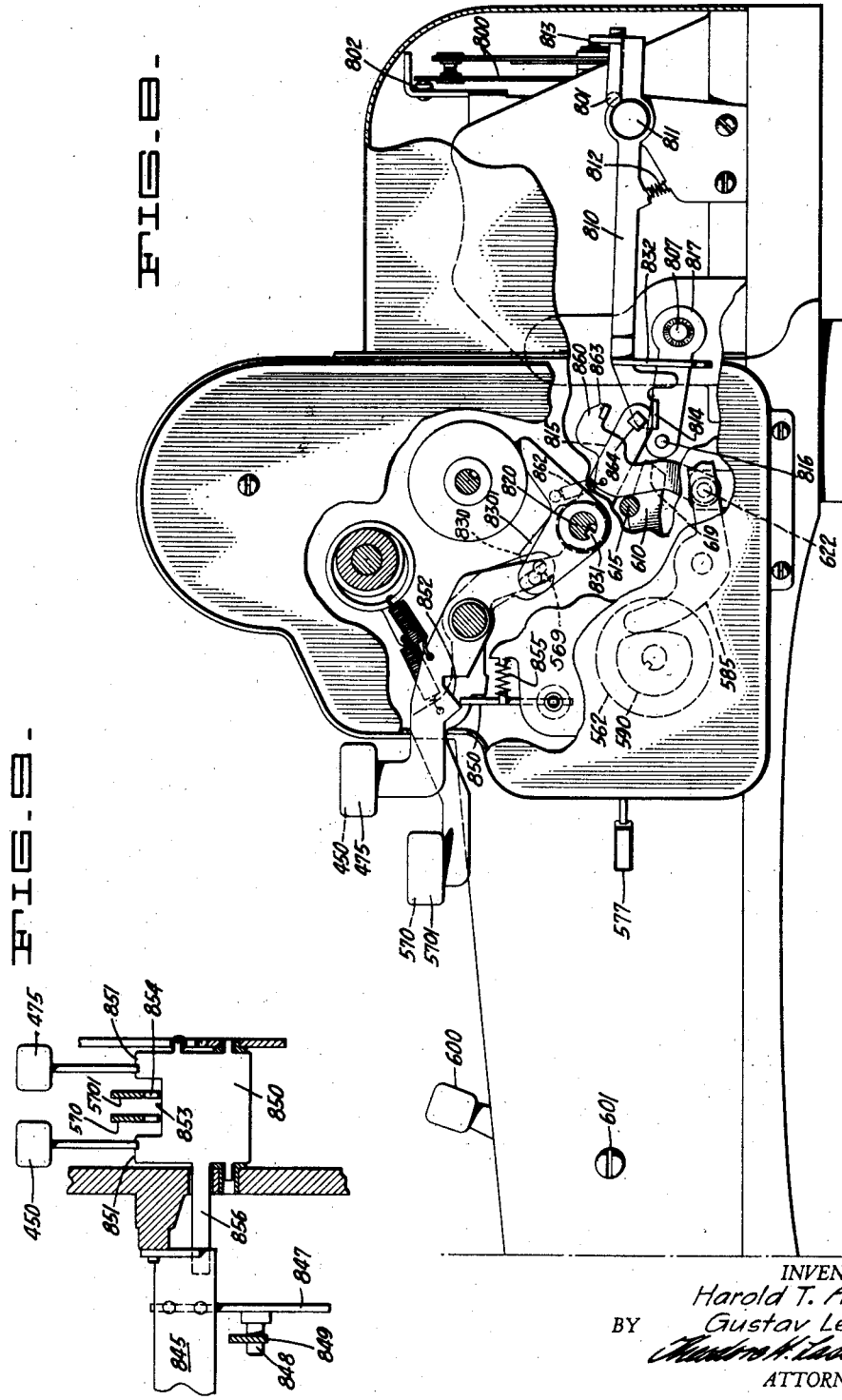

Nov. 26, 1935.  H. T. AVERY ET AL  2,022,103
CALCULATING MACHINE
Original Filed Nov. 6, 1929  12 Sheets-Sheet 7
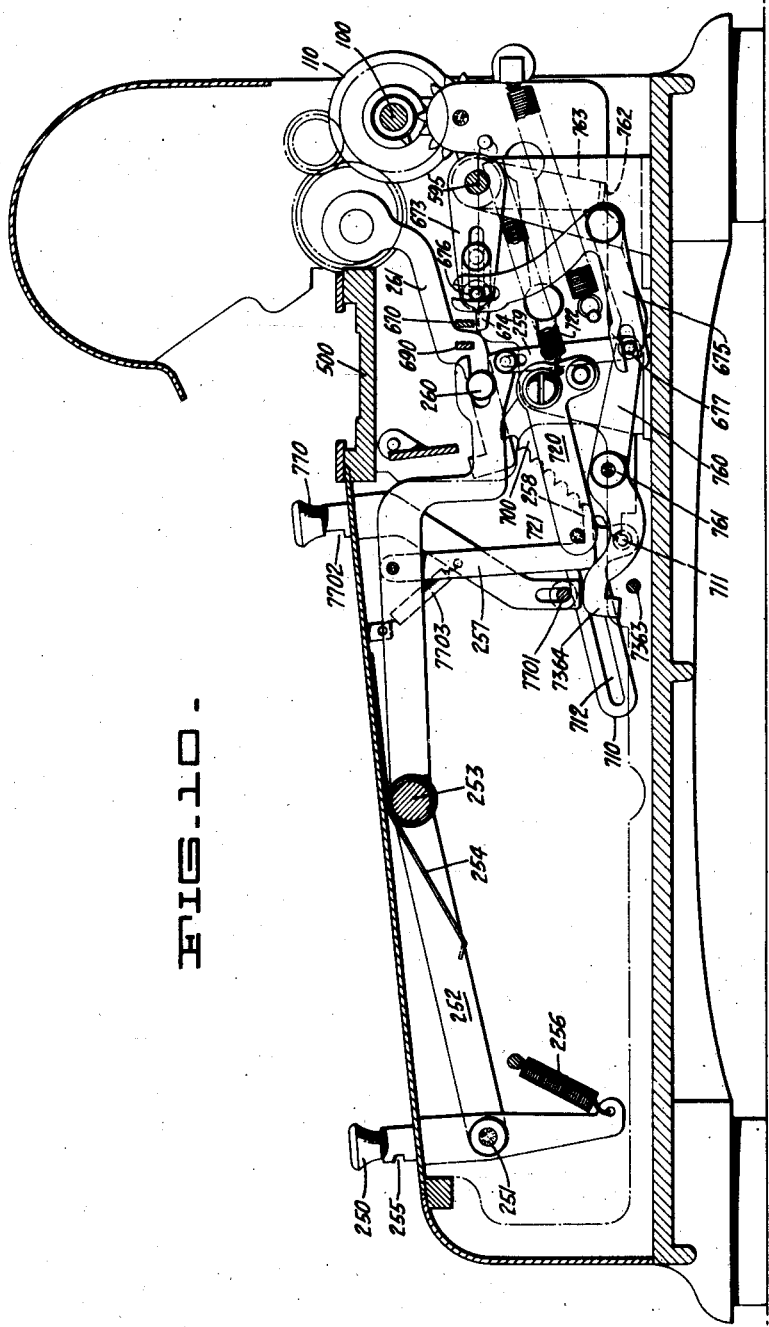
INVENTORS
Harold T. Avery
Gustav Lerch
BY
ATTORNEY

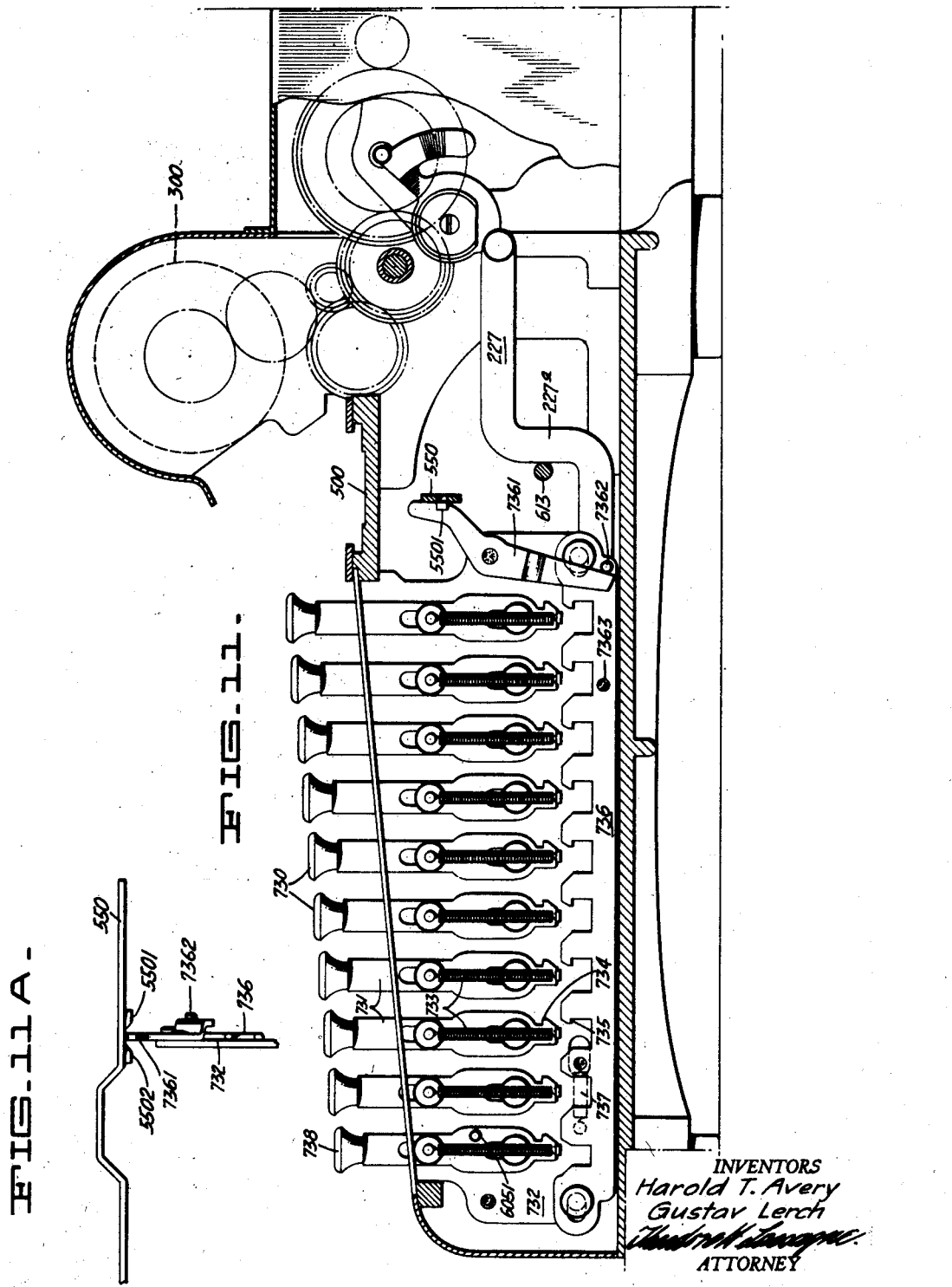

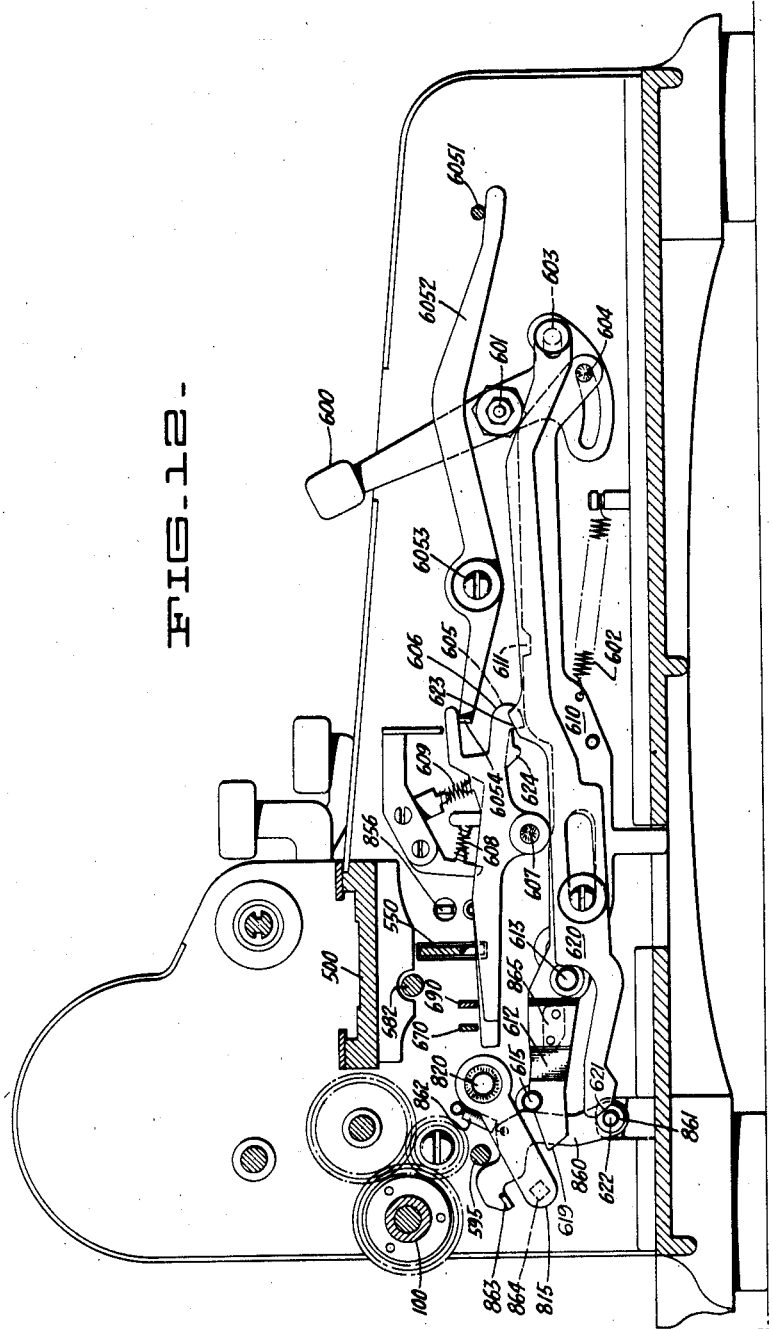

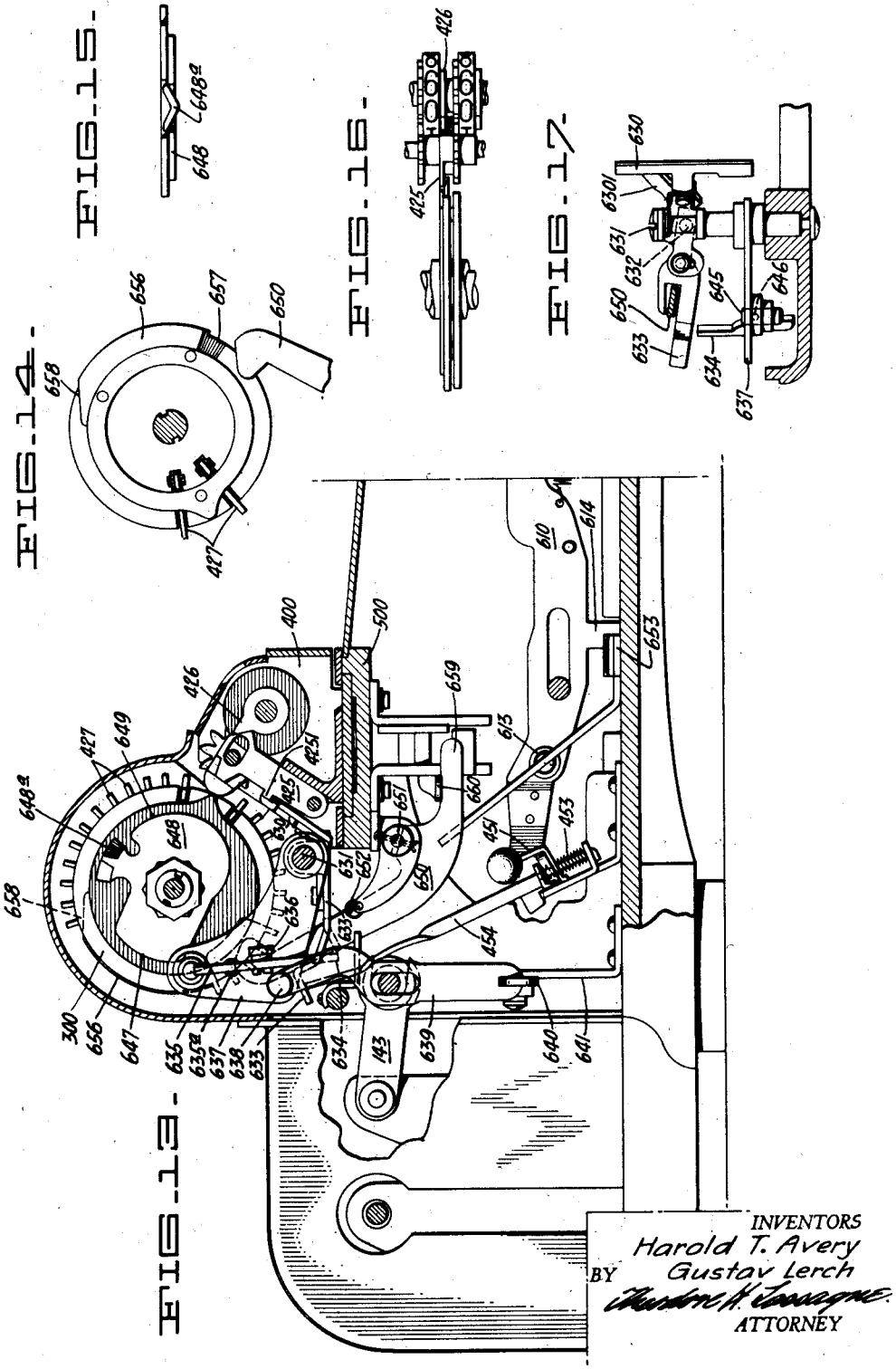

Nov. 26, 1935.  H. T. AVERY ET AL  2,022,103

CALCULATING MACHINE

Original Filed Nov. 6, 1929   12 Sheets-Sheet 11

INVENTORS
Harold T. Avery
Gustav Lerch
BY
ATTORNEY

Nov. 26, 1935.   H. T. AVERY ET AL   2,022,103
CALCULATING MACHINE
Original Filed Nov. 6, 1929   12 Sheets-Sheet 12
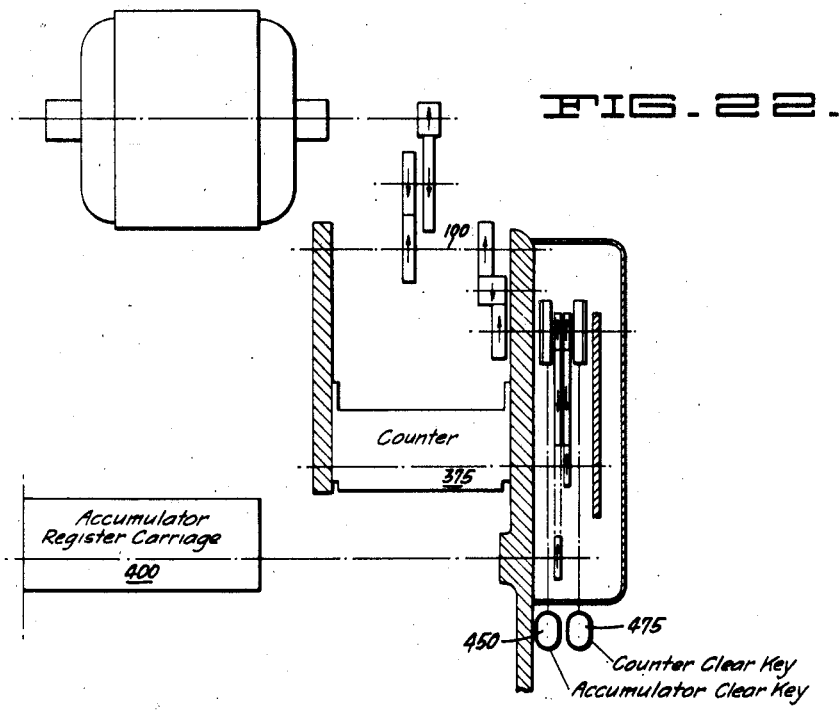
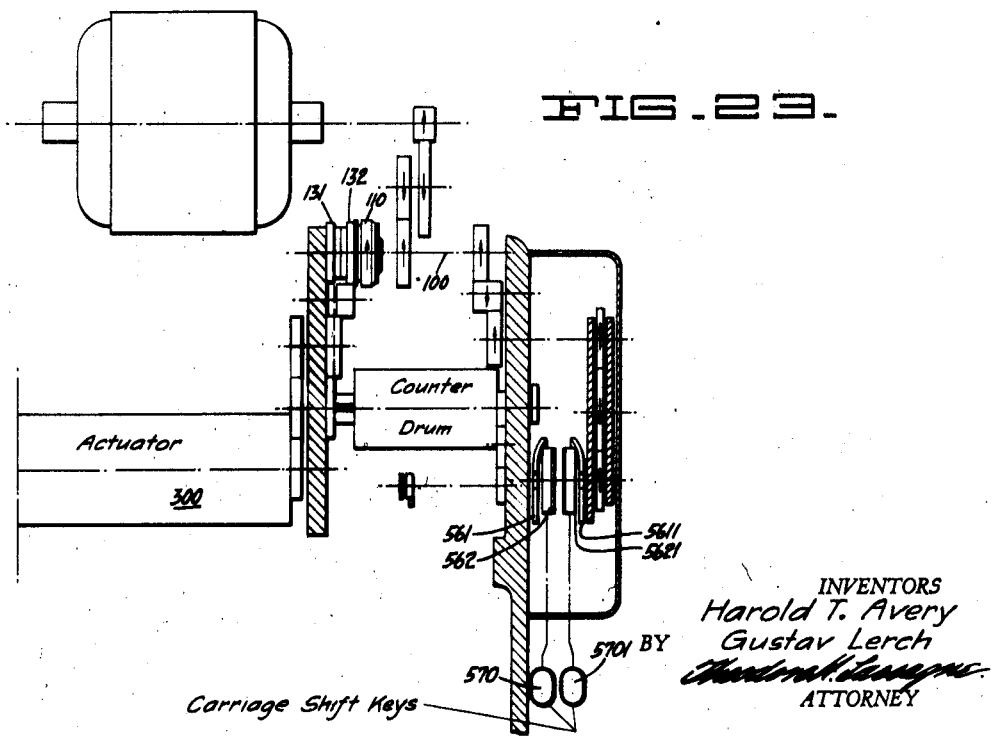
INVENTORS
Harold T. Avery
Gustav Lerch
BY
ATTORNEY Patented Nov. 26, 1935

2,022,103

UNITED STATES PATENT OFFICE 2,022,103

CALCULATING MACHINE

Harold T. Avery and Gustav Lerch, Oakland, Calif., assignors to Marchant Calculating Machine Company, a corporation of California Application November 6, 1929, Serial No. 405,127
Renewed April 15, 1935

21 Claims. (Cl. 235—63)

The present invention relates to calculating machines and particularly to the type in which the various orders of the accumulator are shiftable into operative relation with different orders of the accumulator actuating mechanism. A machine of this type is shown in the patent to Friden No. 1,643,710 dated September 27, 1927, to which reference is hereby made for a disclosure of mechanisms not specifically described herein.

It is an object of the invention to provide an improved mechanism for the automatic performance of problems in multiplication.

Another object of the invention is the provision of an improved mechanism for shifting the carriage of a calculating machine.

Another object of the invention is the provision of means for optionally disabling the automatic carriage shifting mechanism.

Another object of the invention is the provision of means under control of the carriage shifting means for controlling operations of the automatic multiplication mechanism.

Another object of the invention is the provision of a novel automatic releasing means for the multiplier keys.

Another object of the invention is the provision of an improved mechanism for the automatic performance of problems in division.

Another object of the invention is the provision of a novel mechanism for operating machine controls or alarm mechanism upon an overcarry operation.

Other objects will appear as the description progresses.

In the accompanying drawings forming a part of this specification:—

Figure 1 is a longitudinal section looking toward the right, and showing the drive and power control mechanisms.

Figure 2 is a longitudinal section showing the plus and minus bar structures.

Figure 3 is a lateral section showing the reversing gear and division control mechanisms.

Figure 4 is a detail of a portion of the division control mechanism.

Figure 5 is a lateral section showing the automatic carriage shifting mechanism.

Figure 8 is an assembly view of the clearing and shift controls.

Figure 9 is a detail of the clear and shift key's interlocking mechanism.

Figure 10 is a longitudinal section of the automatic multiplier unit showing the automatic shift controls.

Figure 11 is a section showing the multiplier key latch and release mechanism.

Figure 11A is a detail of the multiplier key release mechanism.

Figure 12 is a section showing the division control lever and associated mechanism.

Figure 13 is a section showing certain of the division controls.

Figures 14 to 17 are details of portions of the mechanism shown in Figure 13.

Figures 22 and 23 are diagrammatic views of the various mechanisms.

Figure 6:
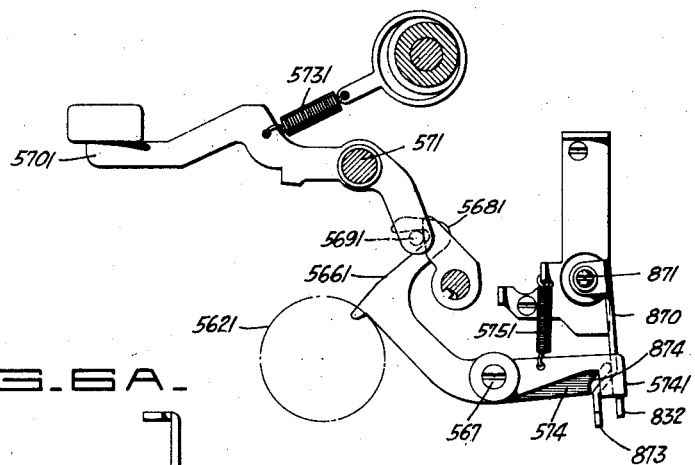
Figures 6, 6A and 7 are details of the shift clutch control.

Calculating machines have previously been provided with automatic carriage shifting mechanism operable after the completion of operations in one order to shift the carriage into an adjacent order for continuance of the computation. This automatic shifting has heretofore been limited to one direction only, some machines being constructed to shift from left to right, while others shift from right to left. Each direction of shift has certain advantages over the other in the performance of certain types of calculations.

For instance, in a multiplication involving three factors, a very convenient and popular method of operation is the "dial transfer" method in which the product of the first two factors is left in the accumulator, the third factor minus one is set on the keyboard so that the last digit lines up with first digit of the intermediate product, and the machine operated additively the number of times in each successive column indicated by the accumulator digit which is lined up with the last digit of the key-board set-up. A three factor multiplication is thus performed without any clearance operations or copying from register to keyboard. If it is desired to preserve the intermediate product, the counter may be cleared after the first multiplication, whereupon the intermediate product will be transferred to it during the second multiplication. This method absolutely requires shifting of the carriage from right to left and it cannot be used with the opposite direction of shift. The convenience of using the multiplier digits in the order in which they are naturally written also makes this direction of shift desirable.

On the other hand, where successive multiplications and divisions are involved, it is desirable to set the multiplier digits from right to left in the counter in multiplication, since in division the shift must necessarily be from right to left and by utilizing an opposite direction of automatic shift in multiplication, successive multiplications and divisions may follow each other without any repositioning of the carriage between such operations. This direction of shift also eliminates positioning of the carriage before beginning a multiplication, since it is merely necessary to move it against the right hand stop. It also makes possible the performance of certain rare problems in multiplication in which the capacity of the machine would be exceeded were the opposite direction of shift used.

The advantages inherent in both directions of automatic shifting are obtained in the present machine by the provision of a shifting switch lever settable by the operator to predetermine the direction of the automatic shift. Two zero multiplier keys are also provided, which operate to shift the carriage in opposite directions without operating the actuator. By these means, the operator may select the direction of shift best adapted to the series of problems in hand.

An additional control, designated as the "Non-shift" key is provided for the purpose of disabling the connection whereby the automatic multiplier unit operates the carriage shifting mechanism. This result may also be accomplished by operation of the "Add" key, but it has the additional function of causing clearing of the keyboard after each operation of the machine, and there are frequent applications in which it is desirable to use the automatic multiplier keys without shifting and without losing the keyboard set-up, as for instance in accumulating total dollar days by setting up successive balances and multiplying by the number of days that each balance is on deposit. In this application, the successive balances may be nearly enough the same to make it convenient to retain the set-up, and the multiplier may be either a one or a two figure value. In case it is a two figure value it is especially essential that the keyboard set-up be retained until the second digit is used. By the addition of the non-shift key the machine is rendered adaptable to any combination of applications in which automatic shift following use of a multiplier key may be desired or may not be desired, and when retention of the keyboard set-up may or may not be desired.

The present machine also incorporates a novel alarm operating mechanism for indicating an overcarry operation, such an operation being one in which a carried or transferred increment is dropped when the capacity of the calculating mechanism is exceeded either additively or subtractively. In automatic division operations the alarm mechanism is disabled and its control mechanism used to control the reversal incident to an overdraft, which is an overcarry in which a subtractive carried increment is lost. The order of the accumulator which operates the said control mechanism is also changed, since in division it is necessary to control the above mentioned reversal from an order in which the carry lever is thrown somewhat before the actuator reaches full cycle position in order to allow sufficient time for the operation of the reversing mechanism, while in all other operations it is desirable to control the alarm from the very last effective order in order to obtain a true indication of the actual capacity of the accumulator. The overcarry in a division operation is always an overdraft throwing all superior orders to nine, and the familiar stagger of the successively operating Trinks type carry teeth makes possible the operation of the reversing mechanism before the actuator reaches full cycle position, but in other operations the overcarry may be additive and may not throw any order but the very last to nine, or it may throw the division controlling order past nine without throwing the last order, and thus the alarm can be accurately controlled only from the last order.

Drive control

In the present embodiment, the driving mechanism comprises an electric motor which is connected to the drive shaft 100 by appropriate speed reducing gearing and is adapted to be intermittently connected to the calculating mechanism to drive the same.

The means whereby the drive is connected to the calculating mechanism includes a clutch 110 (Fig. 1), the driving member of which is a toothed wheel 111, fixed on one end of the drive shaft 100. Enclosing the toothed wheel 111 is a circular housing 112, which constitutes the driven member of the clutch, and pivoted within this housing 30 in a position to engage the toothed wheel 111 is a driving pawl 113. This pawl is normally pressed into engagement with the toothed wheel by means of the inset compression spring 114, but is adapted to be maintained in its non-engaging position by means of the clutch control mechanism. The clutch control mechanism comprises a bell crank member 115 journaled on a stub-shaft 116 on the machine frame and carrying on one arm a foot 117 adapted, when the actuator is in full cycle position, to project through an appropriate positioned aperture in the clutch housing 112 to engage the tail of the pawl 113 and urge it to clutch disengaging position.

A spring 118, tensioned between a stud on the machine base and the opposite arm of the bell crank 115, tends to urge the foot 117 into clutch disengaging position, so that in the absence of intervention by other instrumentalities the actuator will be brought to rest with the clutch in disengaged position when it reaches full cycle position after a rotation. Means are provided for operating the bell crank 115 to engage the actuator for the number of rotations requisite to perform a desired calculation, and pin 119 is provided on the forward end of the bell crank for this purpose. Pin 119 is engaged by the notched rear end of the control link 121 which is pivoted at its forward end to control plate 120 and normally held in position overlying the pin 119 by spring 122 tensioned between the shaft 123 and an intermediate point on the control link. Control plate 120 is fixed on shaft 123 journalled in the machine, and comprises a forward vertical portion 124 adapted to cooperate with the plus bar and a rear angular portion 125 adapted to cooperate with the minus bar. Operation of either of these bars is adapted to impart a counter-clockwise oscillation to control plate 120, as will be hereinafter described. This imparts corresponding counter-clockwise oscillation to the clutch operating bell crank 115 permitting engagement of the driving pawl 113 for the period that such adjustment is maintained. The means whereby the plus and minus bars accomplish this end will be described hereinafter.

Reversing gearing

Fixed to the clutch housing 112 (Fig. 3) for rotation therewith, is a sleeve 130 journaled in an intermediate wall of the machine and journaled upon this sleeve adjacent the clutch housing, are two gears 131 and 132. On their contiguous faces these gears are provided with annular flanges 133, each of which is provided with two oppositely disposed seats of different depth, designed to receive pin 134 fixed in shifting shaft 135, and adapted to engage said seats through oppositely disposed orifices in the sleeve 130. A shifting of the pin 134, then, by means of the shaft 135, causes one or the other of the two gears to be engaged for drive by the clutch housing.

One of these gears includes an intermediate idler in its driving train to the actuator, which the other omits, and they therefore serve to drive the actuator in opposite directions, as shown diagrammatically in Fig. 23. This portion of the mechanism is fully disclosed in the patent to Friden, Number 1,682,901, of September 4, 1928. In Figure 3 the pin 134 is shown so positioned as to drive the actuator in the additive direction, into which position it is normally urged by the spring 226 supporting the minus bar. Means are provided for shifting the shaft 135 to carry the pin into engagement with the negative driving gear 132. This means is made resilient so that its control may be superseded by other controls operative in automatic division operations, as will be hereinafter set forth. The shaft 135 carries a fixed collar 140 which is enclosed by a slidable sleeve 141. This sleeve also encloses a compression spring 142, one end of which bears against the collar, and the other end of which bears against one end of the sleeve, thus maintaining the sleeve in such a position over the collar that its other end bears against the collar. The shifting fork shown in Friden Patent No. 1,643,710 engages this collar 141 as shown at 143, and lateral motion thereof tends to shift the shaft 135 and its pin 134 into engagement with either of the two driving gears selectively.

Plus and minus bars

The present invention includes manual means for controlling the rotation of the actuator for a plurality of operations selectively in either a positive or a negative direction. The means for manually controlling rotation in the positive direction comprises a plus bar 200, supported on a frame 201 (see Fig. 2). This frame is supported on one end of a pair of parallel links 202 which are connected together at their opposite ends by a link 203, and are pivoted intermediate their ends to the plate 210. Spring 204, tensioned between the plate and the lower end of the forward link, serves to hold the plus bar in its elevated position. The frame 201 carries a roller 205 which extends through an aperture in the plate 210 and serves to operate the clutch mechanism.

The means for controlling negative rotation of the actuator comprises a minus bar 220, the stem of which is slidably supported on the plate 210 by means of a pin and slot connection 221 (Fig. 1). This minus bar stem carries a pin 222 overlying one arm of a bell crank 223, pivoted on the opposite side (Fig. 2) of the intermediate plate 210 at 224, and carrying a roller 225 which extends through the aperture in the plate into juxtaposition with the arm 125 of plate 120 which controls the clutch. Depression of the minus bar thus serves to force this roller downwardly, and to the rear against the action of the spring 226 tensioned between the intermediate plate 210 and the lower end of the bell crank 223, and which serves to hold the end of the bell crank carrying the roller 225 in its most elevated position, and the reversing gear in additive position.

Likewise, depression of the plus bar moves its roller 205 downwardly and to the rear, as a result of the manner in which it is supported upon the parallel links 202. The roller 205 projects through an aperture in the intermediate plate 210, and abuts the forward vertical arm 124 of the control plate 120. The roller 225 likewise projects through an aperture in the intermediate plate 210, and abuts the rear angular arm 125 of the control plate 120. Thus, it will be seen that operation of either bar will result in a counter-clockwise oscillation of the control plate and consequent engagement of the actuator clutch. An interlock, to prevent simultaneous operation of the bars 200 and 220, is provided in the form of a rocking bar 230 pivoted intermediate its ends on the intermediate plate 210. One end of this bar underlies the roller 205 on the plus bar frame, while the other underlies an extension of the roller-carrying arm of the bell crank 223. Depression of either key serves to rock the bar 230 into direct contact with the other member which it underlies, to prevent its concurrent operation. Depression of the minus bar also serves to actuate the reversing gearing by causing rearward motion of the link 227, pivoted to the lower end of bell crank 223. Rearward motion of the link 227 oscillates a worm cam playing in a slot in the shaft which carries the gear shifting fork as shown in the Friden Patent No. 1,643,710 above referred to. The reversing mechanism proper has, however, been modified, as hereinbefore explained, to permit a reversal of the direction of rotation of the actuator without effecting a disengagement of the clutch, under certain conditions.

Add key

A special key 250 (Fig. 10) designated as the "Add key" is provided to control the various mechanisms in the performance of addition. This key 250 is pivoted at 251 to a lever 252 pivoted at 253 and supported by spring 254. The upper end of the key stem is provided with a notch 255 adapted to engage the cover plate upon depression of said key to temporarily retain it in operative position. A spring 256 tensioned between the lower end of the key stem and a fixed portion of the machine tends to rock the key into latching position.

The rear end of lever 252 is bifurcated and engages a pin 260 on a pitman 261 driven by the machine, and operative when raised into operative position by the depression of key 250 to release the keys at the end of each cycle of operation. The operation of this pitman in releasing the depressed keys is fully disclosed in the patent to Friden No. 1,643,710 of September 27, 1927.

The key 250 also controls the automatic multiplier and carriage shifting mechanisms as will be hereinafter set forth.

Actuator, accumulator and counter

The actuator drum 300, the counter 375 and the accumulator 400 are substantially identical in construction and operation with the corresponding mechanism disclosed in the patent to Friden, No. 1,643,710 of September 27, 1927, and will not be specifically described herein, reference being had to the said prior patent for a disclosure of these mechanisms. It is sufficient to point out, herein, that the actuator sections are capable of differential adjustment by their associated key sections to effect entry of the numbers set therein into the associated accumulator upon rotation of the actuator drum, the entry being additive or subtractive depending upon the direction of rotation of the drum.

It is understood that the term accumulator, as used herein, applies to a mechanism including numeral wheels operable in opposite directions for addition and subtraction, and is not limited to a bank of numeral wheels operable in one direction only. "Entry" of an item may therefore be either additive or subtractive, and the direction of rotation of the numeral wheels composing the accumulator will be controlled accordingly.

In the present invention a novel mechanism is provided for signalling to the operator when the capacity of the calculating mechanism is exceeded in addition, subtraction, or multiplication. The signalling means is, however, disabled during automatic division, and its control mechanism used as a machine function control in that operation.

A bell 450 (Fig. 3) suitably mounted on the side frame is arranged to be sounded by a clapper 451 pivoted to a standard on the machine base and urged to a neutral position by spring 453. A vertical shouldered push link 454 extending through a slotted lug on the clapper arm constitutes the operating means therefor. In its non-division position the tailpiece 633 of the division reverse control mechanism, hereinafter described, overlies the upper end of link 454. This tailpiece 633 is pivoted at its forward end to the vertically pivoted overcarry lever 630, the forward crosshead of which lies behind the carry levers 425 cooperating with the last three orders of the actuator.

The crosshead is, however, so spaced from the carry levers that their movement will have no effect upon the lever 630 unless some interponent brings the two substantially in contact. The last carry lever on the left of the accumulator is provided with such an interponent in the form of a lug 4251 integral therewith, so that operation of that carry lever will rock lever 630, depressing tailpiece 633 to reciprocate link 454. The bell clapper 451 is thereby oscillated, indicating that a transferred increment has been lost and that the indicated registration is therefor incorrect.

As the accumulator is shifted to the left two more carrying orders of the actuator come into play and the control point for the alarm mechanism is correspondingly shifted. Finally, as the lever 425 carrying lug 4251 passes beyond the last carrying order of the actuator and thus becomes incapable of receiving transferred increments, an interponent in the form of a lug 455 on the left end of the crosshead of lever 630 takes the place of lug 4251 and causes the alarm to be sounded whenever the transfer lever opposite the last carrying order of the actuator is thrown.

In automatic division operations, the tailpiece 633 is moved away from link 454 to a position overlying foot 634 by means hereinafter described. The throwing of transfer levers 425 therefore has no effect on the alarm mechanism during that operation.

*Carriage shifting mechanism*

The accumulator carriage 400 is slidably mounted on a trackway 500 under which is arranged mechanism for manually or automatically shifting the carriage in either direction.

The mechanism for manually shifting the carriage is fully described in the copending application of Friden, Serial No. 539,422, filed February 27, 1922, to which reference is hereby made for disclosure of a suitable carriage shifting means. The present description will be confined to the power operating means for this carriage shifting mechanism, which may be controlled either manually by keys provided for the purpose, or automatically by the machine controls operative in multiplication and division as automatically performed by this machine.

The carriage shifting mechanism includes a plate 502 pivoted at 501 and having a notch 503 in its upper end embracing a pin 504 which is moved laterally to shift the carriage by rocking the plate to one side or the other of its pivot.

For this purpose a link 550 (see Fig. 5) is provided, adapted to be reciprocated in the appropriate direction by the driving motor. This link is designed to impart a quickly accelerated motion to the carriage through approximately the first half of its step of movement, whereupon the acquired momentum is sufficient to complete the shift. The construction which makes this possible has the additional advantage of permitting idle movement of the link in the event of a locking of the carriage mechanism, thus preventing a jam.

The link 550 is slidably supported in the machine by pin and slot connections 551 and 552 to stationary portions of the machine, and is provided adjacent plate 502 with a cut out portion through which pass pivot rod 501 and a pin 553 fixed to plate 502. Pivotally mounted on link 550 at 554 are spring shift bars 555 abutting opposite sides of pin 553 and normally maintained vertical by compression springs 556 disposed between opposite anchors on link 550 and bars 555, pressing said bars against an angular lug 557 on link 550.

The right end of link 550 is provided with notches 560 and 5601 cooperating with peripheral cams 561 and 5611 driven by carriage shift clutches 562 and 5621 respectively to reciprocate link 550 to the right or left, depending upon the clutch selected for operation. The peripheral cams 561 and 5611 are provided with notches 5501 and 5502 (see Fig. 18) respectively, which underlie link 550 when the clutches are in full cycle position, permitting either cam to operate link 550 without interference from the other.

As the link 550 is reciprocated to the right or left by one of the cams, one of the springs 556 is slightly compressed, due to the inertia of the carriage and shifting mechanism, but, as the carriage is started in motion, it expands, accelerating the carriage sufficiently to carry it a full step although the link moves only about a half of a step distance. In the event that the carriage is locked against movement, the spring 555 will merely be further compressed as the bar 555 moves about its pivot 554 during reciprocation of link 550 and no jam will ensue.

The construction and operation of the two shift clutches being substantially identical, only one will be described, except in touching on their differences. The cam 561 driven by clutch 562 shifts the carriage to the right and the said clutch may be controlled by key 570, while cam 5611 driven by clutch 5621 shifts the carriage to the left and this clutch may be controlled by key 5701. These keys are relatively arranged, not with respect to the actual direction of carriage shift, but with respect to the direction of denominational shift, as indicated by the usual pointer associated with counter and which moves oppositely to the carriage. Operation of the right hand key 5101, therefore, moves the carriage into a lower denominational position, while operation of the left hand key 570 moves the carriage into a higher denominational position.

Both clutches are of the same pawl and ratchet type as the main clutch 110 and are mounted on and driven by shaft 563 geared to the main drive shaft 100.

Clutch 5621 is controlled by a clutch control lever 5661 corresponding to the lever 115 which controls the main clutch 110. This shift clutch control lever 5661 is pivoted at 567 and has a hook shaped upper end 5681 adapted to be engaged by a stud 5691 carried on the lower end of key lever 5701 pivoted at 571 and urged to its upper position by a spring 5731 tensioned between the forward portion of the key lever and a convenient shaft of the machine. Both clutch control levers are provided with tails 574 and 5741 for automatic operation, as will be hereinafter described, and are provided with springs 5751 urging them to clutch disengaging position.

*Automatic control of carriage shifting*

Automatic means are provided for engaging the carriage shift clutch at the proper time in automatic multiplication and automatic division operations. Automatic carriage shifting always occurs at the end of an additive rotation of the actuator in automatic multiplication immediately after the last successive addition in each denominational order, and in automatic division at the end of the additive rotation which corrects the overdraft in each denominational order. The shift clutch engaging means is therefore arranged to be driven with the actuator in additive rotation and controlled from the appropriate machine function control.

Figure 7:
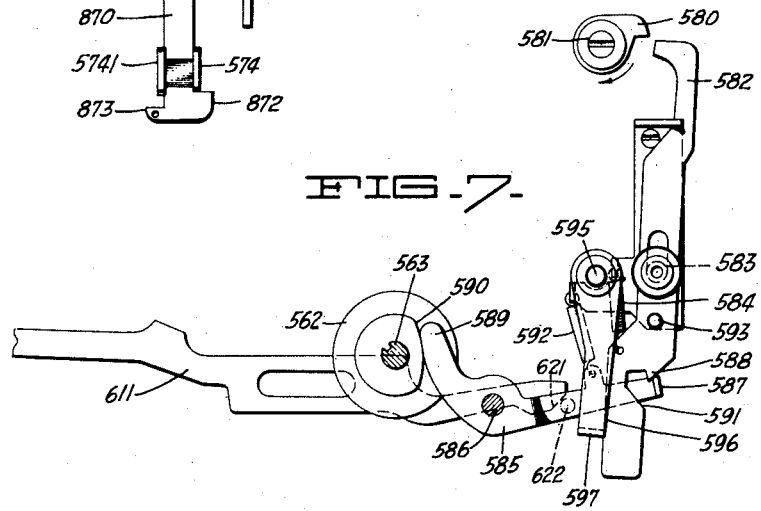

Each one space shift of the carriage to the right has the effect of increasing the value entered into the accumulator by each rotation of the actuator, ten times. Hence the value of a multiplier is determined first, by the number of rotations given the actuator, and second, by the position of the carriage during such actuation. This is hereafter expressed succinctly by stating that the multiplier consists of the product of, first a digit (which is the value of the multiplier key), and second, a power of ten (determined by the position of the carriage). The power of ten, which may be called the exponential constituent of each multiplier, may thus be varied by shifting the carriage. A tripping finger 580 (Figs. 3, 7 and 18) is therefore arranged on the side frame end of shaft 581 which extends through the sleeve carrying the counter transfer drum and is connected to an intermediate gear of the actuator drive train. Regarding the machine from the right side thereof it will be observed that the actuator rotates in counter-clockwise direction for addition. It will thus be seen that in additive rotation of the actuator the tripping finger 580 is rotated in a clockwise direction, regardless of the direction of the counter drum which is independently reversible.

Figure 19:
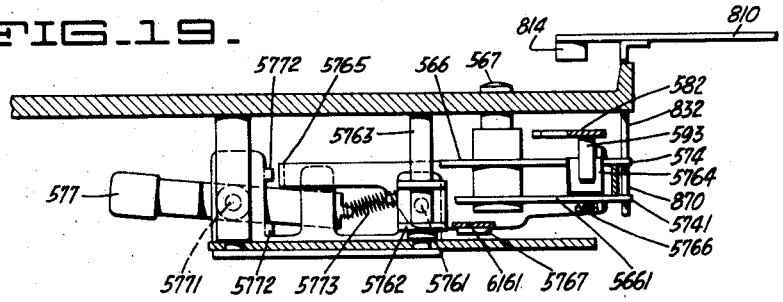
Figure 19 is a plan of details of the automatic carriage shifting mechanism.
Figure 21:
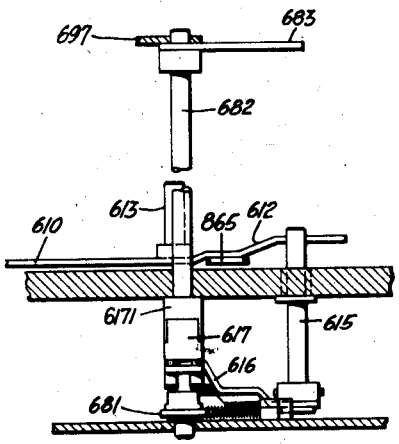
Figures 20 and 21 are details of the automatic carriage shifting mechanism.
Figure 20:
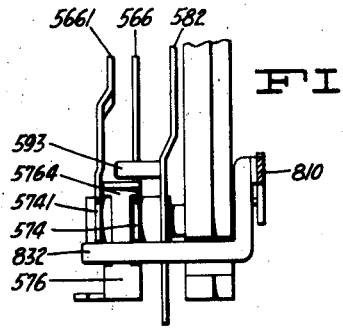

A trip slide 582 is arranged to be vertically reciprocated by the trip finger 580, as the actuator approaches full cycle position (see also Figs. 19 and 20), and for pivotal oscillation by its control member 596 to bring it in and out of the path of the trip finger 580, by means of a pin and slot connection 583 through which it is supported on the machine frame. A spring 584, tensioned between the machine frame and the lower arm of the member 582, tends to oscillate it in a clockwise direction and carries it out of the path of the trip finger. A latching member 585, pivoted at 586, has a laterally bent end portion 587, adapted to latch behind a tooth 588 on the trip slide 582 to retain said slide in an active position in the path of tooth 580 until the shift clutch is actuated. The tail 589 of the latch member cooperates with a two part cam 590 (Figs. 5 and 7), half of which is fixed to clutch housing 562 and half to clutch housing 5621, so that rotation of either clutch will rock the latch member in a clockwise direction, bringing its laterally bent end 587 against the cam face 591 of the trip slide and positively camming it out of the path of the tooth 580 to prevent a second operation of the shift clutch by releasing the lever 566 or 5661 to its clutch disengaging position. A spring 592 tensioned between the frame and the latch lever 585 tends normally to retain it in position to engage behind tooth 588.

A control shaft 595, journaled in the side frame of the machine, carries a depending lever 596, having a laterally bent end portion 597, lying in contact with the front side of the trip slide 582. The lower end 597 of the lever 596, when moved to the rear by means of control shaft 595, will oscillate the trip slide 582 into its effective position where it will be latched. This control shaft will be oscillated at the proper times in automatic computations hereinafter described, to initiate carriage shifting.

Figure 18:
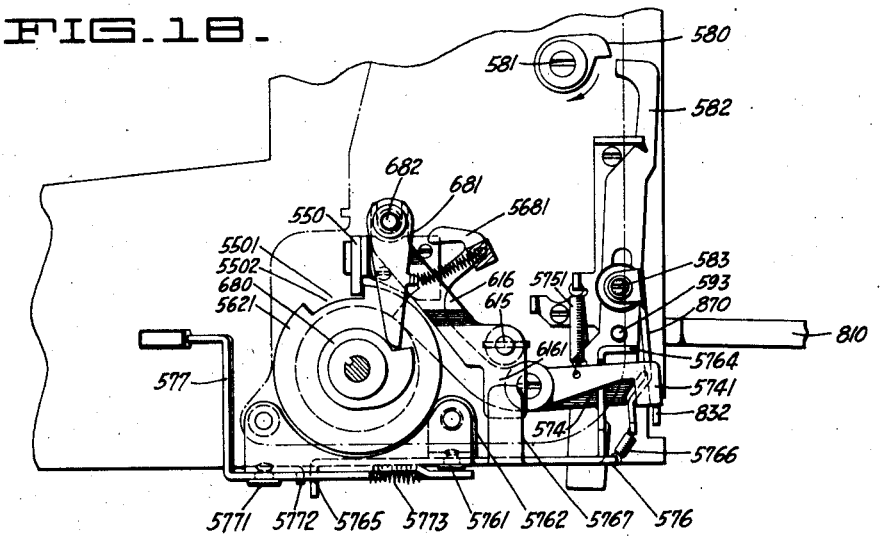
Figure 18 is an elevation of the automatic carriage shifting mechanism.

The shift clutch trip slide 582 carries a pin 593 (Figs. 18, 19 and 20) adapted, on reciprocation of the slide, to operate either clutch control lever 566 or 5661, depending on the position of the shift clutch control interponent 576, which is pivoted at 5761 to a strap 5762 journaled on shaft 5763 so that it is capable of horizontal movement to select one or the other clutch control lever for operation, and vertical movement to operate the one selected. A T-shaped head 5764 on the interponent 576 is adapted in one position to overlie the clutch control lever tail 5741 and in its other position to overlie the tail 574. The head is likewise angled, as shown in Figure 18, to underlie pin 593 in either position of the interponent. Reciprocation of the shift clutch trip slide 582 therefore, will depress the head 5764 of the interponent and the underlying tail of one of the shift clutch control levers, depending upon the horizontal adjustment of the interponent. One or the other of the shift clutches will thus be engaged for a cycle of operation, shifting the carriage one step to the right or left.

The means for effecting horizontal adjustment of the interponent 576, to control the direction of this automatic shift comprises a manually operable lever 577 pivoted to the frame at 5771 and having a rear portion lying adjacent and to the right of a bent down front end 5765 of interponent 576. The automatic shift switch lever 577 is movable horizontally between stops 5772 and a compression spring 5773 disposed between the rear of the lever and a point on the frame tends to maintain it in either adjusted position.

A spring 5766 tensioned between the tail of interponent 576 and member 570 tends to move the head of the interponent to its position overlying control lever tail 574, and when the finger piece of the shift switch lever 577 is in its leftmost position, it is free to do so. An automatic shift initiated while this adjustment is maintained will depress tail 574, operating lever 566 and engaging shift clutch 562 shifting the carriage one step to the right.

When the shift switch lever 577 is moved to its right hand position, however, the head of interponent 576 is moved to its position overlying control lever tail 5741. An automatic shift initiated while this adjustment is maintained will depress tail 5741 operating lever 5661 and engaging shift clutch 5621 shifting the carriage one step to the left.

It will be noted that the directional adjustment of the shift switch lever corresponds to the direction of denominational shift indicated by the counter indicator as in the case of the shift keys, and not to the direction of shift of the carriage.

*Automatic division*

Automatic division is performed in the present machine upon entry of the factors in the usual manner, setting the carriage and shifting the division lever into its forward position, whereupon the following operations ensue wholly automatically, and the quotient is accurately registered in the counter mechanism. Shifting of the division lever starts the actuator in the subtractive direction, and it acts to subtract the selected decimal multiple of the divisor from the dividend, registering the number of subtractions in the counter in the usual manner, until an overdraft occurs. The occurrence of an overdraft operates controls which effect a reversal of the actuator driving gear without effecting a disengagement of the actuator driving clutch. The cycle immediately following upon the overdraft cycle therefore corrects the overdraft and a control operative in this cycle acts to disengage the actuator clutch in full cycle position and to engage the carriage shift clutch for a single cycle. The carriage shift drive mechanism approaching the termination of its cycle of operation actuates controls to reengage the actuator clutch and again drive the actuator in the subtractive direction. This tour of operation repeats itself successively in consecutive denominational orders until the carriage reaches home position, when a special control intervenes to prevent engagement of the carriage shift clutch and all the mechanism is consequently brought to rest with all controls restored to their normal position.

The automatic division lever 600 (Fig. 12) is pivoted at 601 to the side wall of the machine, and its upper end is rocked toward the front of the machine to initiate a division operation. By this motion it moves toward the rear of the machine main division slide 610, and supplemental division slide 620, against the force of spring 602 tensioned between the base of the machine and the main division slide. The short pin and slot connection 603 connects the supplemental division slide to the division lever so that this slide follows the movement of the division lever in both directions. The main division slide is, however, connected to the division lever by a longer pin and slot connection 604.

This longer pin and slot connection 604 is so arranged that the main division slide will be pushed to the rear by a forward rocking of the division lever, but will not be returned by a return of the division lever to inoperative position. A pair of latching pawls 605 and 606 are pivoted side by side on the side frame of the machine at 607. The heads of both these pawls cooperate with a notch 611 in a widened portion of the main division slide, into which they are pressed by their individual springs 608 and 609, compressed between the forward portion of the respective pawls and an extension of the side frame. By this means the main division slide 610 is latched in the rear position to which it is forced by an operation of the division lever 600 until the two latching pawls 605 and 606 are concurrently raised.

Adjacent its rear end the main division slide 610 has a camming bend 612 which cooperates with a notch in shaft 615 to shift the shaft laterally on a movement of the slide. Shifting of this shaft operates the shifting fork 616 fixed adjacent its opposite end which controls the engagement of the restart clutch 617, the purpose of which is presently to be described.

Spaced from its rear end the main division slide 610 carries a laterally extending pin 613, the remote end of which lies directly in front of a vertical portion 227a (see Fig. 2) of the link which controls the actuator reversing gear. Rearward motion of the slide 610 then serves to move the link 227 and place the gear control in position to cause subtractive rotation of the actuator.

Concurrently, the bell crank 123 (Fig. 2) attached to the forward end of link 227, is rocked and the upper arm carrying roller 225 is moved downwardly, the roller being carried downwardly and toward the rear of the machine, in the same manner as when the bell crank is actuated by the minus bar. In this motion it rocks control plate 120 to cause engagement of the main actuator clutch 110. This mechanism is locked in this position for the duration of the division operation by the latches holding the main division slide in its rearward position. The actuator, being thus set in motion, rotates continuously, subtracting the divisor or its decimal multiple from the dividend set in the accumulator carriage at each successive rotation until an overdraft occurs. In an overdraft operation, as is well known in the art, a borrowing carry operation occurs which results in all effective numeral wheels to the left of those actuated, being operated from their normal zero registration to a nine registration.

The movement of the familiar carrying mechanism of the machine in this operation is utilized to control the reversal of the actuator to effect a correction of the overdraft. The carry mechanism includes carrying levers 425 (Fig. 13) normally latched in their forward position as shown, but adapted to be tripped to and resiliently latched in their rearward position by a lug 426 on the numeral wheel in a direct transit between zero and nine. Directly behind the carry lever 425 of the numeral wheels cooperating with the next to last carrying order of the actuator toward the left, is a lever 630, pivoted to the machine frame at 631. The pivot 631 permits movement of lever 630 in a vertical plane when a carry lever 425 is tripped. Pivoted for movement in a horizontal plane to the end of the lever at 632, is a bifurcated tailpiece 633. This tailpiece is movable on its pivot by means under control of the main division slide, presently to be described in connection with the means for terminating the additive correction stroke, and in its automatic division position overlies the foot 634 of a vertical lever 635 pivoted at 636 on a second lever 637, which is also pivoted to the machine frame at 631. Pivoted to the lever 637 at 638 is a depending link 639 (see also Fig. 3), the lower end of which engages one arm of a bell crank 640 pivoted to a standard 641 on the machine frame. The upper arm of the bell crank 640 operates against a collar 642 on the shaft 135 in such a manner that rocking of the bell crank brought about by downward pressure on link 639 shifts the shaft 135 so that it carries its pin 134 into engagement with the gear 131 which serves to drive the actuator in the positive or additive direction. This shift is positively brought about by means driven from the actuator and controlled by the numeral wheels in an overdraft operation.

In this operation it is necessary to time the operation of lever 630 so that it is thrown somewhat before the actuator reaches full cycle position, at which point the reversal takes place. For this purpose the front end of lever 630 is constructed in the form of a T, (see Fig. 5) the cross of which lies behind the three levers 425 cooperating with the last three orders of the actuator. These last three orders are merely carrying orders having no differential mechanism, although the lower of the three may be provided with differential mechanism if desirable, without modifying the other structure.

The last carrying lever 425 toward the left of the accumulator is provided with a lug 4251 enabling it to rock lever 630 from any of its three possible positions adjacent the crosshead thereof, but the remaining levers 425 are not provided with such a lug and are not rocked far enough to operate lever 630 unless the space between is filled by an interponent. Such an interponent 6301 is provided adjacent the third from the highest order of the actuator, being pivoted to the lever 630 at 6302 and provided with a notch in its lower end in which lies the forward end of tailpiece 633. When the tailpiece is moved to its automatic division position overlying foot 634, its forward end moves interponent 6301 into operative position so that the lug 6303 thereon lies between the cross head of bar 630 and whichever transfer lever 425 happens to be opposite.

Since the transfer teeth 427 on the drum are disposed in staggered relation around the periphery thereof, the lever 425 opposite lug 6303 will, in an overdraft operation, be thrown back a few degrees before the actuator reaches full cycle position, allowing sufficient time for the above described reversing mechanism to function as follows.

The carrying lever 425 of the controlling denominational order is rocked to the rear, carrying with it the lever 630 and depressing its tailpiece 633. This depresses the foot 634 of the vertical lever 635, rocking said lever against the pressure of spring 635a to depress a pin 645 slidably arranged in a socket in the upper end of lever 637 and arranged to be retained in either of its two adjusted positions by a spring pressed ball indicated at 646. These operations occur just before the actuator reaches its full cycle position and their result is to project the end of pin 645 into a position where it will be engaged by a specially formed cam face 647 on a plate 648 fixed on the left end of the actuator shaft. This engagement, taking place while the actuator is still under drive in the negative direction, drives the system including lever 637, link 639, bell crank 640, and shaft 135 to positively carry the pin 134 out of its seat in gear 132 and into its seat on gear 131, just as the actuator reaches full cycle position and against the force of spring 142 which is compressed in this operation, rendering unnecessary a release of the link 227 which normally controls the position of pin 134 and also controls the main actuator clutch. Thus the actuator is reversed without disengaging the main clutch and enters upon an additive cycle.

Pressure on the linkage system above outlined is at once relieved upon reversal of the actuator, but a reseating of the pin 134 in gear 132 seat under pressure of spring 142 is prevented by the displacement of the seat, and reversal in half cycle position is prevented by a back cam-lobe 649 on plate 648 which maintains link 639 depressed at this point in the cycle. At the end of a single cycle of additive rotation, the actuator is arrested in full cycle position by disengagement of the main clutch and spring 142 is permitted to reseat pin 134 in its seat in gear 132.

Clutch disengagement at the end of the corrective additive rotation is accomplished under control of a lever 650, doubly pivoted for limited universal movement at 651. A spring 652, tensioned between the upper portion of the lever and a fixed portion of the framework, urges the lever toward its operative position but it is normally maintained in inoperative position by a link 653, one end 654 of which abuts against the tail of the lever 650 on the side opposite the spring and the other end of which is formed with a cam face 655 (see also Fig. 4). When the main division slide 610 is in its inoperative position, a depending arm 614 thereon lies in the path of the link 653 and prevents it being forced to the left, in Figure 3, by the force of spring 652, thus maintaining the lever 650 in its inoperative position. However, when the main division slide 610 is moved rearwardly to its operative position, the depending arm 614 is carried out of the path of the link 653 and the spring 652 is permitted to move the lever 650 into operative position. The upper arm of this lever lies in the fork of the bifurcated tailpiece 633 hereinbefore referred to, and this tailpiece is carried to its operative position along with the lever. In its operative position the end of the lever 650 lies in the path of a cam 656 (see also Fig. 14) carried on one of the actuator segments. The end of the camming member which approaches the lever during subtractive rotation of the actuator, carries a side bevel 657 which acts to move the lever 650 aside without tripping it, but the end which approaches the lever in additive rotation of the actuator carries a cam face 658 which acts to rock the lever 650 about its vertical pivot, lifting its tail 659. This tail underlies and thus acts to lift one end (see Fig. 3) of a double lever system 660, expediently pivoted in the machine, the other end (see also Fig. 5) of which lies in an aperture in the rearward end of the actuator clutch control link 121. The lift exerted on the one end of the double lever system 660 causes a corresponding lift at the other end, raising the clutch control link 121 clear of pin 119 on the actuator clutch control bell crank 115. Thus released, the bell crank 115 at once contacts the clutch housing 112 under urge of spring 118, and as the clutch reaches full cycle position, the foot 117 enters the aperture in the clutch housing and disengages the clutch, locking the actuator in full cycle position. During the additive rotation just completed a cam 648a (see Fig. 15) formed on plate 648 acts to restore pin 645 to its normal inoperative position.

Means are provided for automatically engaging the proper carriage shift clutch upon disengagement of the main actuator clutch. Since in automatic division the direction of carriage shift must always be from right to left, means are provided under control of the main division slide 610 for moving the selecting interponent 576 over clutch lever tail 5741, regardless of the adjustment of shift switch lever 577. As hereinbefore set forth, the positioning of main division slide 610 shifts shaft 615 to move shifting fork 616 into position to engage the restart clutch 617. The shifting fork is provided with a depending portion 6161 lying adjacent the left side of an upstanding portion 5767 of the interponent 576. Thus upon setting of the main division slide the rear end of interponent 576 will be moved to its right hand position overlying clutch lever tail 5741 and each subsequent reciprocation of trip slide 582 will cause engagement of clutch 5621, shifting the carriage one step to the left.

Means are provided for causing automatic engagement of this carriage shift clutch upon disengagement of the main actuator clutch. A lever 670 (Fig. 5) pivoted at 671 on a rigid member dependent from the carriage track, has an angular tail portion 672, overlying the clutch control link 121, and a nose overlying locking pawl 605 and the nose 674 of a lever 673 fixed on control shaft 595. When the control link 121 is raised to arrest the actuator at the end of the corrective addition rotation, the lever 670 is rocked clockwise and its nose depresses lever 673 (see also Fig. 10), rocking control shaft 595 to trip the automatic carriage shift control mechanism as hereinbefore set forth.

Toward the end of the cycle of operation of carriage shift clutch 5621, cam 680 rigid with cam 5611 driven by said clutch, rocks its cooperating arm 681 to reengage the main clutch. This arm is journaled on a shaft 682, on the opposite end of which is fixed an arm 683 underlying a pin 684 on the actuator clutch control lever 115. Movement of the arm 681 is normally idle, but setting of the main division slide 610 operates shifting fork 616 moving clutch member 617, keyed to collar 6171 fixed to the shaft 682, into engagement with a complementary clutch face 6172 fixed to arm 681 and clutches it to the shaft so that when it is rocked by cam 680 the lever 115 will be rocked to reengage the actuator clutch. The lever 115 is then latched by the reengagement of its pin 119 in the notched end of control link 121. This tour of operations is repeated in each denominational order until the carriage reaches home position.

Means are provided for terminating the calculation at the end of a tour of operations if the carriage is in its home position. Lever 690 (Fig. 5) pivoted at 691, has a nose overlying both latches 605 and 606, which it trips concurrently, completely releasing the main division slide 610 so that it may be returned to inoperative position by its spring 602 to terminate a calculation. A link 692 connects the tail of lever 690 with one end of a finger 693 pivoted at 694 and positioned to project through an aperture in the carriage track into contact with the under side of the carriage in which direction it is urged by spring 695. The aperture is so positioned that the carriage covers it and blocks the rise of the finger except when said carriage is in its home position. The lower end of the finger also carries a pivoted latch 696 which projects through a slot in plate 697, depending from the lower side of the carriage track and is urged into latching position against the lower end of said slot by a spring 698 tensioned between an intermediate portion of the latch and the depending plate 697.

The nose of the latch overlies the actuator clutch control link 121 and is therefore raised at the conclusion of each corrective additive rotation when the actuator clutch is disengaged. If the carriage is out of home position, the finger 693 is unable to rise under urge of spring 695, and the latch merely falls back without effect. If, however, the carriage is in home position, the spring moves the finger through the aperture and concurrently moves link 692 to the right, rocking lever 690 and depressing the tails of underlying latches 605 and 606, thus completely releasing the main division slide 610, which returns to its inoperative position, terminating the calculation. The carriage shift trip slide 582 is, as usual, tripped to its operative position by lever 670, but is returned to inoperative position (see Fig. 7) before being actuated by the action of cam face 621 on the supplementary division slide 620 which depresses pin 622 on the trip slide 20 latching member 585, depressing this lever and positively camming the slide 582 to its inoperative position.

Manually controlled means are provided for terminating a calculation prior to its completion. The calculation may be terminated at the conclusion of its tour of operation in any denominational order by a manual return of the division lever 600 to its inoperative position at any time during the tour of operation. This carries the supplementary division slide 620 (Fig. 12) to its forward position and a cam face 623 formed thereon acts on a lug 624 formed on latch member 606 to release said latch from the notch 611 in the main division slide. The main division slide is, however, maintained in its operative position by latch 605 until the end of the tour of operations when it is tripped by the rocking of the overlying lever 670, the tail of which overlies actuator clutch control link 121. Tripping of latch 605 completes the release of the main division slide 610, permitting it to return to inoperative position and terminating the calculation.

The second latch 605 may alternatively be released by manually operated means under control of the multiplier clear key to terminate the calculation at the end of any cycle of the actuator and before completion of a tour of operations.

The stem of the multiplier clear key is provided with a pin 6051 overlying one end of lever 6052 pivoted to the side wall of the machine at 6053. The other end of this lever has a laterally bent portion 6054 lying in a wide notch in latch 605. Depression of the multiplier clear key rocks the lever 6052, raising latch 605, and provided latch 606 has been released by return of lever 600, this action will complete the release of slide 610, terminating the calculation. This last releasing means for the latch 605 is only used, however, when the machine has been misoperated, as when the division lever has been pulled while no factors are set in the machine, in which case it operates continuously in the subtractive direction and no other means is effective to arrest it.

*Automatic multiplication*

The calculating machine as shown in the patent to Friden No. 1,643,710 is provided with a trip slide for tripping or raising the rear end of the latch lever 121 to release the clutch control lever 115 at the end of a selected predetermined number of rotations of the actuator.

Movement of the trip slide 700 serves to raise the rear end of the latch bar 121, and the trip slide is moved by a pin 711 carried by the slide bar 710, which is positioned in variable angular positions, depending upon the predetermined number of rotations of the actuator, by the lever 720, which is provided with a pin 721 engaging in a slot 712 in the slide bar 710. The slide bar 710 is connected to a rack, as disclosed in said patent, which is restrained against movement by a spring and which is moved in a step-by-step movement by a pinion operated by the actuator clutch. The slide bar 710, which carries the pin 711, is therefore moved one step for each rotation of the actuator, and, by variably positioning the slide bar 710, a different number of steps of movement are required before the pin 711 comes into engagement with the step face of the slide plate 700. The next rotation of the actuator after such engagement causes the pin 711 to move the slide plate 700 and thereby disengage the latch bar 121 from the clutch control lever 115.

Normally the slide bar 710 is in depressed position, being normally held in this position by the spring 722 connected to the lever 720, which is in turn connected to the slide bar 710. When the slide bar 710 is in its normal depressed position the pin 711 is positioned in zero position, that is, one station below the number one position, in which zero position it is shown in Figure 10. When the pin 711 is in this zero position, it may oscillate through one step of movement, moving the slide 700 for less than a full step, as set forth in Friden Patent Number 1,643,710, thus preventing operation of the trip slide latch.

The unit is provided with a series of keys 730 ranging in value from 1 to 9, and these keys serve to position the pin 711 to automatically control the number of revolutions of the actuator. Depression of the key valued 8, for instance, will position the pin 711 in front of the eighth step on the slide plate 700, so that on the eighth rotation of the actuator the latch bar 121 will be raised and the clutch housing stopped.

The stems 731 (Fig. 11) of the keys 730 are mounted on the plate 732 and are normally held in elevated position by springs 733 attached to the lower ends of the key stems. Means are provided for holding the depressed keys in depressed position (Fig. 11). Each key stem 731 is provided on its lower end with a hook 734 which is adapted to engage under a complementary hook 735 on the key retaining slide 736. This slide is mounted on the plate 732 and is normally held in forward position by the spring 737. When a key is depressed the slide is moved rearwardly and then springs forwardly under the influence of the spring to bring the hook 735 over the hook 734 on the key, thus retaining the key in depressed position. The slide 736 is not provided with a hook in association with the stem of the number 1 key, so that the number 1 key is not held depressed. The operation of the machine is so rapid that when the number 1 key is depressed the operation is almost immediately completed and if a retaining hook were provided in connection with this key and pressure was not released from the key immediately upon its depression, the key would not be released at the end of the calculating operation, because such operation would be completed and the key releasing means would have been actuated prior to the release of the pressure on the key. The key 738 at the forward end of the bank of keys 730 is a clearance key and its function is to move the slide 736 to cause the release of any keys 730 which may be held depressed.

In addition each key is provided with means for operating any suitable differential mechanism for differentially positioning the control pin 711, and causing engagement of the actuator clutch. Such a mechanism is fully disclosed in the patent to Friden No. 1,643,710.

*Control of carriage shifting in automatic multiplication*

The plate 700 is thereafter moved to the rear by pin 711, to actuate instrumentalities for terminating the calculation. It is at this point in the operation that it is desired to initiate action of the shift clutch. There is provided therefor a member 760, pivoted to the plate 700 at 761, and abutting at its rear end a laterally bent portion 762 of a lever 763, depending from the control shaft 595. Rearward motion of the plate 700 then, will impart a counter-clockwise oscillation to control shaft 595, rocking lever 596 carried on its opposite end, and tripping slide 582 into operating relation relative to tooth 580. As the actuator reaches home position, this tooth 580 contacts the upper end of slide 582, depressing the slide and its pin 593 to raise the selected shift clutch control arm and engage said clutch. As the clutch starts, cam 590 rocks the latch member 585, camming the slide 582 out from under the arrested tooth 580, and releases the clutch control arm 566 so that the trip clutch will be disengaged and arrested in full cycle position at the end of a single rotation.

Means operable by the carriage shifting means are provided for releasing the multiplier key latching means (see Figs. 11 and 11a).

The carriage shift link 550 is provided with a pair of struck out camming lugs 5501 and 5502 between which is disposed a release lever 7361 pivoted on plate 732, the lower end of which lies directly in front of a stud 7362 carried on the key latching slide 736. Movement of the link 550 to shift the carriage in either direction thus rocks the release lever 7361 releasing the multiplier key latching mechanism.

Means are provided under control of the "add" key 250 for disabling this shift clutch control when said key is depressed. This key 250 is maintained in depressed position during straight adding and subtracting operations, and acts to release the keyboard set-up and to limit the rotation of the actuator to a single cycle in either direction unless a multiplier key is depressed. For this purpose a link 257 is attached to the lever 252 and has a foot 258 extending under pin 721 of the multiplier pin adjusting mechanism. Depression of the key 250 raises this link slightly, bringing pin 711 into cooperation with the "one" step of plate 700 so that the plate will be moved during the first rotation of the actuator to cause disengagement of the actuator clutch. The keyboard releasing function has been hereinbefore described. To prevent undesirable operation of the automatic carriage shift when this takes place, a second link 259 is provided connecting the rear end of lever 252 with an intermediate portion of member 760. Raising of the rear end of lever 252, incident to the depression of the key 250, thus raises the rear end of member 760 so that when it moves to the rear with plate 700 it will overshoot the laterally bent end 762 of lever 763 and omit actuation of the shift clutch.

The movement of plate 700 arrests the actuator by throwing off link 121 from the clutch control bellcrank 115 as set forth in Friden Patent No. 1,643,710. In automatic division a similar throw-off of link 121 is accomplished by lever system 660, but the movement of link 121 is sufficiently greater in the division operation to effect rocking of lever 670 controlling the carriage shift. While the movement of lever 670 in automatic multiplication is not ordinarily great enough to operate the automatic carriage shifting mechanism, it is desirable to prevent any possibility of its doing so while the "add" key 250 is depressed, and means are provided therefor.

The nose 674 (Fig. 10) is slidably arranged by a pin and slot connection upon lever 673 so that in its extended position it underlies lever 670, permitting actuation of the carriage shifting mechanism thereby, but in its retracted position it clears said lever, preventing actuation of the said mechanism thereby. A bifurcated arm of bell crank 675 engages a stud 676 on said nose and the other arm of said bell crank is likewise bifurcated and engages a stud 677 on link 760. The nose 674 is therefore moved into its retracted position by depression of key 250, preventing any possibility of actuation of the carriage shifting mechanism during its depression.

Since the carriage shifting mechanism is disabled during depression of the "add" key 250, it is necessary to provide an alternative means for releasing the multiplier keys which may be used for effecting repeated additions while the "add" key is depressed. The lever 760, which is rocked by the depression of the "add" key to disable the multiplier carriage shifting control, has a hooked front end 7364 adapted to engage over a stud 7363 carried by the multiplier key latching bar 736. When the key 250 is depressed, disabling the carriage shift control and consequently rendering the normal multiplier key releasing means ineffective, the hook 7364 engages over the stud 7363 and carries the slide 736 to the rear with plate 700 releasing the multiplier key's latching mechanism.

In certain applications hereinbefore mentioned, it is desirable to use the multiplier keys without the automatic shift feature, and without losing the keyboard set-up. For this purpose a special "non-shift" key 770 is provided. This is slidably and pivotally mounted by a slot and stud connection 7701 to the frame and is provided with a notch 7702 and spring 7703 for retaining it in depressed position. The lower end of the key stem lies directly over the hooked front end 7364 of link 760 so that depression of the key raises the rear end of the link disabling the automatic control mechanism for carriage shifting in multiplication, and lowers the front end, enabling the addition multiplier key release. The connection of link 259 with lever 252 is slotted to permit this movement.

Power control and interlocks

Means are provided for controlling the circuit of the driving motor to effect closure thereof only when one of the several machine controls is functioning. A pair of normally open, spring blade contacts 800 (Fig. 1) are connected in series in the motor circuit and are mounted in a suitable insulating block fixed to shaft 801, journaled in the frame. Clockwise oscillation of shaft 801 is adapted to bring the near contact blade against abutment 802 to effect a closure of the contact. One means for producing this oscillation of the shaft comprises a lever 803, fixed to one end thereof and connected by a push link 804, a shouldered end of which is retained in a slot in lever 803, and rod 805, to a lever 806 fixed to shaft 807 journaled in the frame. The lever 806 lies directly behind and in contact with clutch control bell crank 115, so that a rocking of this bell crank to cause engagement of the actuator clutch will rock lever 230 rearwardly, effecting closure of the motor circuit through the linkage just described.

A second means for operating the contacts comprises a lever 810 (see Figs. 8 and 18) pivoted to the frame at 811 and supported by spring 812. One end of this lever has a perforated angular portion 813 which receives an angled end of shaft 801 while the other end is provided with a foot 814 underlying arm 815 fixed on one end of shaft 820. This shaft 820 supports four members, any of which may effect its oscillation; the accumulator clear clutch bell crank, the counter clear clutch bell crank, and the shift clutch power control levers 830 and 8301. Each of these is journaled on the shaft 820 and carries a projection 831 extending into a wider groove in the shaft so that oscillation of any of these members will effect oscillation of the shaft without actuating the other members journaled thereon. Oscillation of shaft 820 by this means depresses arm 815 and foot 814, rocking shaft 807 in the proper direction to effect closure of the contact.

Arm 815, when in its depressed position, overlies a pin 816 on the end of arm 817 fixed to the end of shaft 807 opposite lever 806. Consequently, when arm 815 is depressed it blocks oscillation of shaft 807 and prevents actuation of the actuator clutch bell crank 115. Conversely, when the actuator clutch bell crank 115 is rocked to engage the clutch, the shaft 807 is rocked bringing the pin 816 into contact with the under side of lever 815 and blocking oscillation of shaft 820. This effects an interlock between the clear and shift keys and the main actuator clutch so that neither can be operated while the other is in operation. The shift clutch power control lever 830 has an arm lying directly behind pin 569 on the tail of the shift clutch key 570. It is thus oscillated by depression of the shift clutch key and is maintained in its adjusted position by an extension 832 of arm 818 which underlies the tails of both shift clutch control levers, and also maintains the circuit closed during the shifting operation in automatic multiplication operations. In automatic division operations, however, the contacts are maintained closed throughout the computation by the cam end 619 (Fig. 8) of the main division slide 610 which rides over the foot 814 of the contact control lever 810 and maintains it depressed throughout the operation.

A lock is provided to prevent engagement of the main clutch while either shift clutch is functioning, comprising an arm 860 pivotally mounted on lever 585 at 861 and supported by spring 862. Lever 585 is depressed throughout the operation of either shift clutch by the cam 590 carrying the lug 863 on arm 860 against a square stud 864 carried on arm 815 blocking the said arm down against stud 816 to lock the actuator clutch.

During division the restart of the actuator clutch must be accomplished somewhat before the shift clutch reaches home position, so a plate 865 (see Fig. 12) is positioned on the main division slide 610 so as to ride against arm 860 when the slide is operatively positioned, forcing the lug 863 to the rear of square stud 864 and disabling the lock.

Figure 6A:
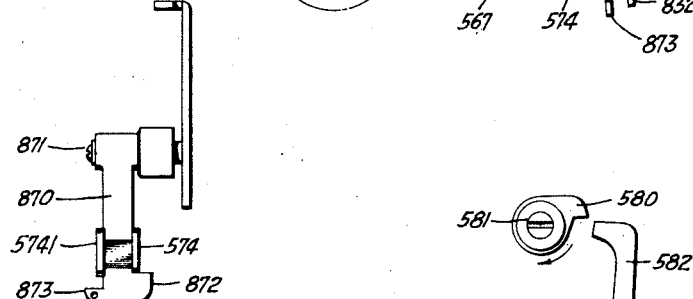

An interlock is provided to prevent operation of either shift clutch control lever while the other shift clutch is operating, comprising a plate 870 (Figs. 6 and 6a) pivoted at 871 and provided with shoulders 872 and 873 underlying control lever tails 574 and 5741 respectively. The tail 574 is provided with a cam surface, which, on operation of the lever, rides against shoulder 872, moving plate 870 to a position where its shoulder 873 underlies the end of tail 5741, preventing its operation. Conversely, operation of lever 5661 places a portion of its tail 5741 behind the shoulder 873, preventing pivotal motion of plate 870 and blocking descent of tail 574 to prevent operation of its clutch.

An interlock is provided between the clearing keys and the zero multiplier or automatic carriage shift control keys, to permit concurrent operation of the two clearing keys but to lock the shift keys by the operation of either clear key and, conversely, to lock both clearing keys upon operation of either shift key.

A locking plate 850 is pivoted beneath the four keys, between the side frame and a fixed plate, and has edges 851 underlying cam surfaces 852 of the clear keys 450 and 475 and an edge 853 adjacent edges 854 of the shift keys. A spring 855 tends to hold the plate in the vertical position as shown in Figure 8.

Depression of either of the clear keys 450 or 475 will rock the plate 850, carrying the edge 853 under the body of keys 570 and 5701 and thus preventing depression of the shift keys, while depression of either shift key will prevent rocking of plate 850 and thus lock both clear keys against depression.

A set of locking arms 840 fixed on shaft 841 are operable through arm 842 by a cam 843 on the actuator shaft, to lock the selection in the drum while it is out of full cycle position. Means are also provided for actuating this locking means whenever an operating bar or multiplier key is depressed. A link 844 connects an extension of one of the locking arms 840 with a gate 845 pivoted at 846. Carried on a downward extension 847 (see Figs. 1 and 9) of gate 845 is a stud 848, over which lies the notched rear end of a link 849 connected at its forward end to the control plate. Depression of an operating bar or a multiplier key rocks this plate, as hereinbefore set forth, rocking the gate and moving the locking arms 840 to locking position.

An extension 856 of the locking plate 850 lies directly behind gate 845 so that rocking of the gate also rocks plate 850, locking both shift keys against operation.

While the preferred construction has been described in the foregoing specification, it is understood that the invention is capable of modification within the scope of the following claims.

We claim:

1. In a calculating machine, registering means, a member movable thereby as an incident to a carrying operation, a plurality of elements operable by said member, and settable means for moving said member into operative relation with any one of said elements whereby said elements may be selectively operated by said registering means as an incident to a carrying operation.

2. In a calculating machine, registering means, a member movable thereby as an incident to a carrying operation, a signal operable by said member, power-operable mechanism comprising a controlling element adapted to be positioned by said member, and settable means for positioning said member in operative relation with either said signal or said element whereby either may be operated by said registering means as an incident to a carrying operation.

3. In a calculating machine, a member operable by an overcarry operation, a plurality of elements operable thereby, means for selecting any of said elements for operation by said member, and means for changing the cyclic time of operation of said member upon selection of certain of said elements for operation thereby.

4. In a calculating machine, a control means operable upon an overcarry operation, a plurality of mechanisms adapted for control thereby, means for selectively associating said control means with any of said mechanisms, and means for varying the cyclic time of operation of said control means upon selection of certain of said mechanisms.

5. In a calculating machine, overcarry control mechanism, automatic division control means, and means controlled by said means for changing the cyclic time of operation of said mechanism.

6. In a calculating machine, overcarry control mechanism having a plurality of selectable control points, automatic division control means, and means controlled by said means for shifting the effective control point of said mechanism to alter the cyclic time of operation of said mechanism.

7. In a calculating machine, a shiftable carriage, a plurality of orders of registering elements carried thereby, a control member adapted to be actuated by different registering elements as said elements are operated with the carriage in different positions, means associated with said member for transmitting motion from the highest effective order registering element to said member in certain positions of said carriage, and means associated with the highest order registering element for transmitting motion from said element to said member when all orders are shifted out of operative relation with said first mentioned means.

8. In a calculating machine, a shiftable accumulator, an overcarry control member having an operative connection therewith, means for shifting said operative connection with the accumulator for a plurality of shifting operations thereof, and means for shifting said connection relatively to said accumulator during other shifting operations thereof.

9. In a calculating machine having a shiftable carriage, a member operable by an overcarry operation, means for selecting any of a plurality of elements for operation by said member, means conditioned by selection of a certain element and controlled by said member for initiating a carriage shifting operation, and means for controlling the direction of carriage shifting.

10. In a cyclically operable calculating machine having a shiftable carriage, carriage shifting mechanism, a member movable for terminating operation of the machine, means operable thereby for setting said carriage shifting mechanism for subsequent release, cyclically operating means for releasing said mechanism for operation when it has been so set, and settable means for modifying the action of said cyclically operating means upon said mechanism whereby the direction of operation of said shifting mechanism may be reversed.

11. In a calculating machine having a shiftable carriage, shifting means therefor, an actuator, a member for controlling collateral operations of said actuator and said shifting means, and means settable independently of said member for predetermining the direction of operation of said shifting means.

12. In a calculating machine having a shiftable carriage, shifting means therefor, an actuator, a member for controlling collateral operations of said actuator and said shifting means, and independently operable controlling means for reversing the direction of operation of said shifting means.

13. In a calculating machine having a shiftable carriage, devices for shifting said carriage in opposite directions, means normally positioned to render one of said devices effective at the end of a multiplication operation, and means for positioning said means to render the other of said devices effective at the end of a multiplication operation.

14. In a calculating machine having a shiftable carriage, carriage shifting mechanism, automatic division control mechanism including controlling means for said carriage shifting mechanism, automatic multiplication control mechanism including controlling means for said carriage shifting mechanism, means for selectively controlling the direction of said automatically controlled carriage shifting, and means operative in automatic division for superseding the control of said means.

15. In a calculating machine having a shiftable carriage, carriage shifting mechanism, automatic division control mechanism including controlling means for said carriage shifting mechanism, automatic multiplication control mechanism including controlling means for said carriage shifting mechanism, means for preselecting the direction of said automatically controlled carriage shifting, and means controlled by said automatic division mechanism for disabling said means.

16. In a calculating machine having a shiftable carriage, shifting means therefor, an actuator, a set of keys for initiating operations comprising predeterminately varying numbers of operations of said actuator followed by operation of said shifting means, and settable means for reversing the direction of operation of said shifting means in such operation.

17. In a cyclically operable calculating machine, registering means, a member operable thereby as an incident to an overcarry operation, a plurality of elements operable by said member, settable means for positioning said member in operative relation with any of said elements, and means controlled by said settable means for changing the cyclic time of operation of the selected element upon changing the operative relationship of said member and said elements.

18. In a cyclically operable calculating machine, registering means, a member operable thereby as an incident to an overcarry operation, a signal operable by said member, power-operable mechanism comprising a controlling element adapted to be positioned by said member, settable means for positioning said member in operative relation with either said signal or said element, and means controlled by said settable means for advancing the cyclic time of operation of said member when it is placed in operative relation with said element.

19. In a cyclically operable calculating machine, registering means, a member operable thereby as an incident to an overcarry operation, a power operable mechanism comprising a controlling element adapted to be positioned by said member, a settable means for positioning said member in operative relation with said element selectively, and means controlled by said settable means for advancing the cyclic time of operation of said member when it is placed in operative relation selectively with said element.

20. In a calculating machine, numeral wheels, an actuator therefor and an overdraft control mechanism associated with said numeral wheels and said actuator including means for selectively varying the cyclic time of the tripping of said mechanism.

21. In a calculating machine, numeral wheels, an actuator therefor, an overdraft control mechanism adapted to be tripped by said numeral wheels and operated by said actuator, and means for varying the cyclic time of the control of said mechanism by said numeral wheels.

HAROLD T. AVERY.
GUSTAV LERCH.